United States Patent [19]
Tani

[11] Patent Number: 5,477,265
[45] Date of Patent: Dec. 19, 1995

[54] DEVICE FOR CONTROLLING IMAGING DEVICE

[75] Inventor: Nobuhiro Tani, Tokyo, Japan

[73] Assignee: Asahi Kogaku Kogyo Kabushiki Kaisha, Tokyo, Japan

[21] Appl. No.: 251,675

[22] Filed: May 31, 1994

Related U.S. Application Data

[63] Continuation of Ser. No. 15,047, Feb. 8, 1993, abandoned, which is a continuation of Ser. No. 705,565, May 24, 1991, abandoned.

[30] Foreign Application Priority Data

May 25, 1990 [JP] Japan ................................... 2-136521
May 25, 1990 [JP] Japan ................................... 2-136522

[51] Int. Cl.$^6$ ................................................. H04N 5/335
[52] U.S. Cl. .......................... 348/241; 348/243; 348/297; 348/224
[58] Field of Search .................................. 348/297, 223, 348/224, 243, 244, 241; H04N 5/355

[56] References Cited

U.S. PATENT DOCUMENTS

| | | | |
|---|---|---|---|
| 4,589,025 | 5/1986 | Monahan et al. | 358/213 |
| 4,679,212 | 7/1987 | Hynecek | 377/58 |
| 4,700,231 | 10/1987 | Matsumoto | 358/221 |
| 4,786,969 | 11/1988 | Shouji et al. | 358/171 |
| 4,839,729 | 6/1989 | Ando et al. | 358/213.16 |
| 4,845,566 | 7/1989 | Sakai et al. | 358/213.24 |
| 4,914,518 | 4/1990 | Suga | 348/243 |
| 4,972,266 | 11/1990 | Tani | 358/213.19 |
| 4,984,085 | 1/1991 | Landowski | 358/213.31 |
| 4,994,917 | 2/1991 | Takayama | 358/213.15 |
| 5,008,758 | 4/1991 | Burke | 358/213.16 |
| 5,031,048 | 7/1991 | Naruto et al. | 358/228 |
| 5,216,511 | 6/1993 | Tani | 358/213.16 |
| 5,272,536 | 12/1993 | Sudo et al. | 348/243 |
| 5,278,658 | 1/1994 | Takase | 348/243 |
| 5,311,320 | 3/1994 | Hashimoto | 348/243 |
| 5,339,162 | 8/1994 | Tani | 348/298 |

FOREIGN PATENT DOCUMENTS

| | | | |
|---|---|---|---|
| 0205189 | 12/1986 | European Pat. Off. | H04N 3/15 |
| 0357084 | 3/1990 | European Pat. Off. | H04N 5/217 |
| 60-53383 | 3/1985 | Japan | H04N 5/335 |
| 60-174583 | 9/1985 | Japan | H04N 5/335 |
| 63-234676 | 9/1988 | Japan | H04N 5/335 |
| 1235486 | 9/1989 | Japan | H04N 5/335 |
| 2-31571 | 2/1990 | Japan | H04N 5/335 |
| 2162976 | 6/1990 | Japan | H04N 5/335 |
| 2187060 | 8/1987 | United Kingdom | H04N 5/33 |

OTHER PUBLICATIONS

English language translation of the German Office Action dated Jul. 26, 1994.
English Language Abstract of JP-60-53383.
English Language Abstract of JP-60-174583.
English Language Abstract of JP-1-235486.
French Search Report and Annex.
English Language Translation of the German Office Action of Nov. 12, 1992.
English Abstract of Japanese Patent No. 2-31571.
British Search Report.
An English Abstract of Japanese Application No. 2-162976.

*Primary Examiner*—Joseph Mancuso
*Assistant Examiner*—Bipin Shalwala

[57] ABSTRACT

A control device includes a control mechanism for eliminating a dark current effect generated in a CCD. The control mechanism carries out a charge pumping operation in the CCD during a time after an object is photographed up until the time when an aperture is closed. The control mechanism obtains a dark current component generated when the aperture is closed after a photographing operation, based on a dark current component outputted by the CCD during a predetermined period, and then subtracts the dark current component from data outputted by the CCD in accordance with an image signal corresponding to the subject.

6 Claims, 7 Drawing Sheets

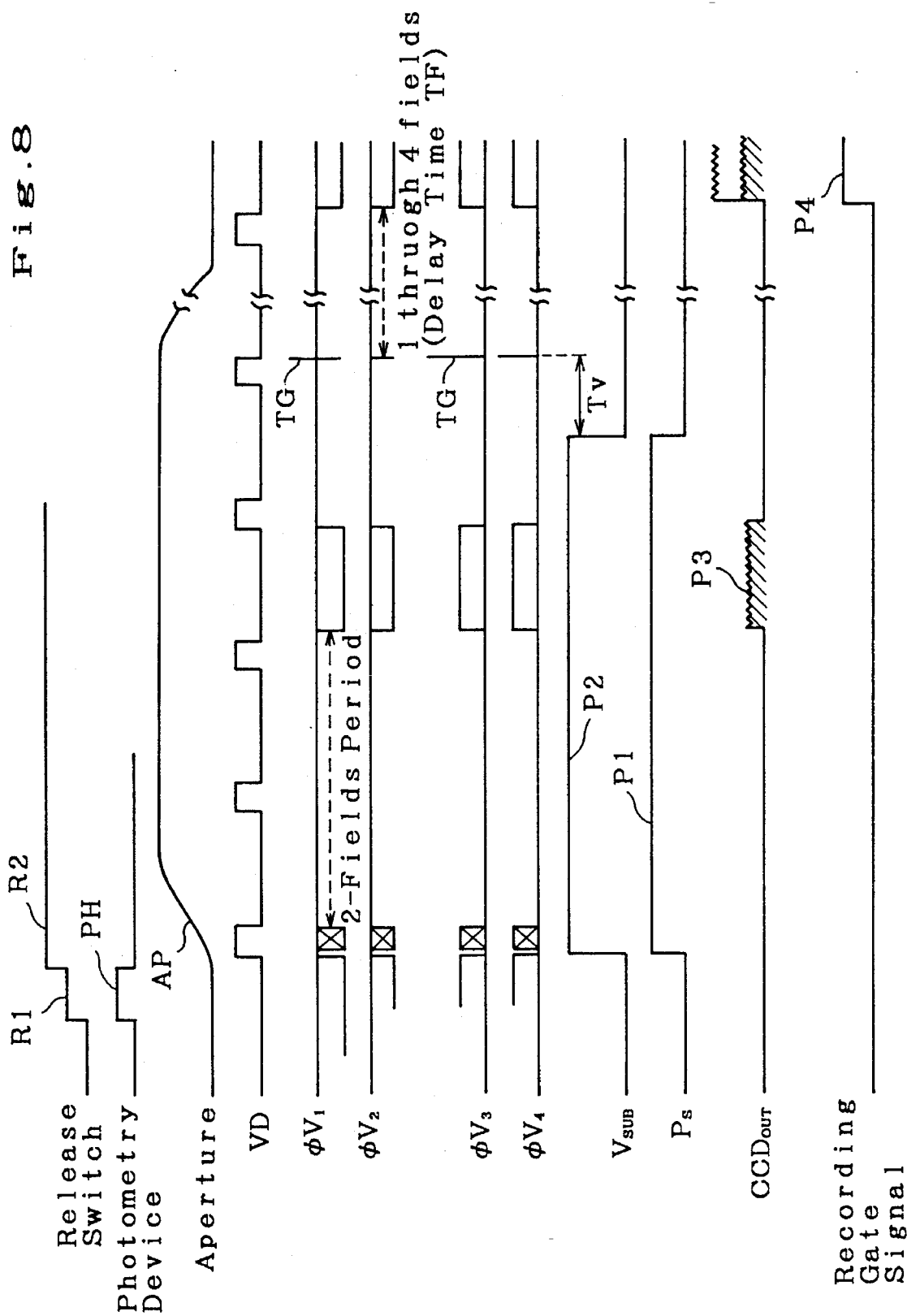

5,477,265

DEVICE FOR CONTROLLING IMAGING DEVICE

This application is a continuation of application No. 08/015,047, filed Feb. 8, 1993, now abandoned, which is a continuation of application No. 07/705,565, filed May 24, 1991, now abandoned.

BACKGROUND OF THE INVENTION

1. Field of the Invention

The present invention relates to a control device for controlling an imaging device, the control device providing a required effect when applied to an electronic still video camera.

2. Description of the Related Art

In an electronic still video camera, when an object is photographed, an image signal of the object is outputted by an imaging device such as a CCD (Charge Coupled Device), and is recorded in a video floppy disk. After the object is photographed, a dark current is generated in the imaging device until an aperture of the camera is closed. The amount of dark current becomes large when the temperature of the imaging device becomes high due to continuous operation of the imaging device. Accordingly, an image obtained by the camera is deteriorated by a white noise, such as a white flaw, which is caused by a large amount of dark current.

SUMMARY OF THE INVENTION

Therefore, an object of the present invention is to provide a control device which prevents image deterioration caused by increases in the amount of dark current.

According to the present invention, a control device comprises an aperture for controlling an exposure to an imaging device, an aperture control circuit for operating the aperture in accordance with a result of a photometry processing of an object, and an eliminating mechanism. The eliminating mechanism eliminates the effect of dark current generated in the imaging device, and after photographing of the object, operates in accordance with an operation of the aperture control circuit.

Further, according to the present invention, there is provided a device for controlling an imaging device which outputs an image signal corresponding to an object. A dark current is generated in the imaging device during a period at which an aperture is closed after a shutter is closed. The control device comprises an aperture control circuit and a removing mechanism. The aperutre control circuit is provided for operating the aperture in accordance with a result of a photometry processing of the object. The removing mechanism removes an excess amount of dark current from an output of the imaging device, in synchronization with an operation of the aperture control circuit.

Furthermore, according to the present invention, a control device controls an imaging device, and outputs an image signal corresponding to an object to be photographed. The control device comprises an aperture for controlling an exposure to the object, and a removing mechanism. The removing mechanism removes excess dark current from an output of the imaging device, after the object is photographed and until the aperture is closed.

BRIEF DESCRIPTION OF THE DRAWINGS

The present invention will be better understood from the description of the preferred embodiments of the invention set forth below, together with the accompanying drawings, in which:

FIG. 8 is a timing chart showing an operation of the second embodiment.

DESCRIPTION OF THE PREFERRED EMBODIMENTS

Figure 1:
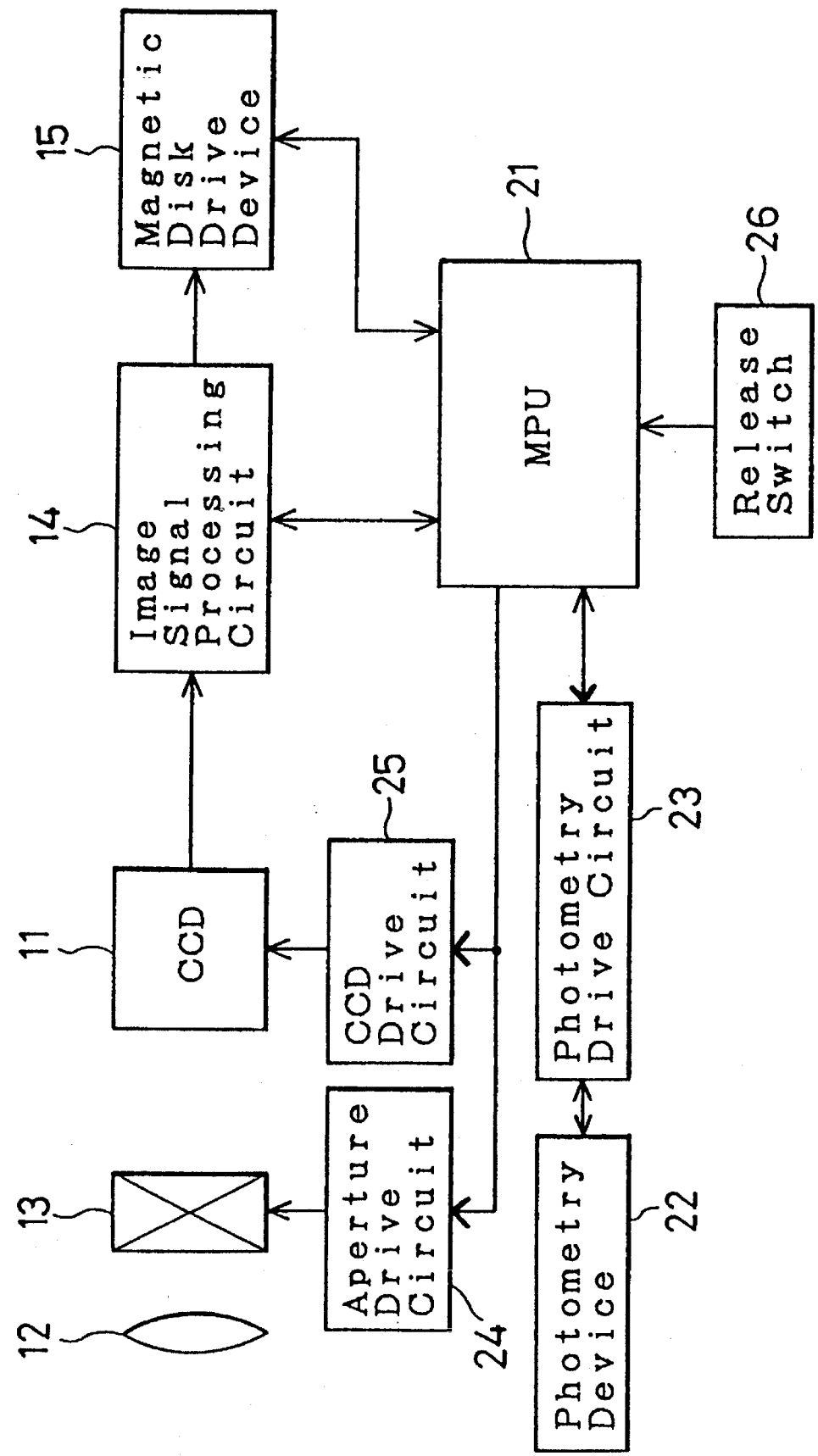
FIG. 1 is a block diagram showing a construction of a first embodiment of a control device for an imaging device according to the present invention.

The present invention will now be described with reference to embodiments shown in the drawings.

FIG. 1 is a block diagram showing a construction of a first embodiment of a control device for an imaging device according to the present invention.

Light reflected by an object (or subject to be photographed; not shown) enters a CCD (Charge Coupled Device) 11 or an imaging device through a taking lens 12 and an aperture 13. The CCD 11 outputs an image signal, corresponding to an object image, to an image signal processing circuit 14. The image signal is processed and frequency-modulated by the image signal processing circuit 14, and then inputted to a magnetic disk drive device 15, to thereby be recorded onto a video floppy disk (not shown).

A control circuit 21, which may, for example, comprise a microcomputer (MPU), drives a photometry device 22 through a photometry drive circuit 23, whereby a photometry process is carried out. When the results of the photometry process are obtained, the aperture 13 and the CCD 11 are operated accordingly through an aperture drive circuit 24 and a CCD drive circuit 25, respectively. A release switch 26 is operated when carrying out a photographing operation.

Figure 2:
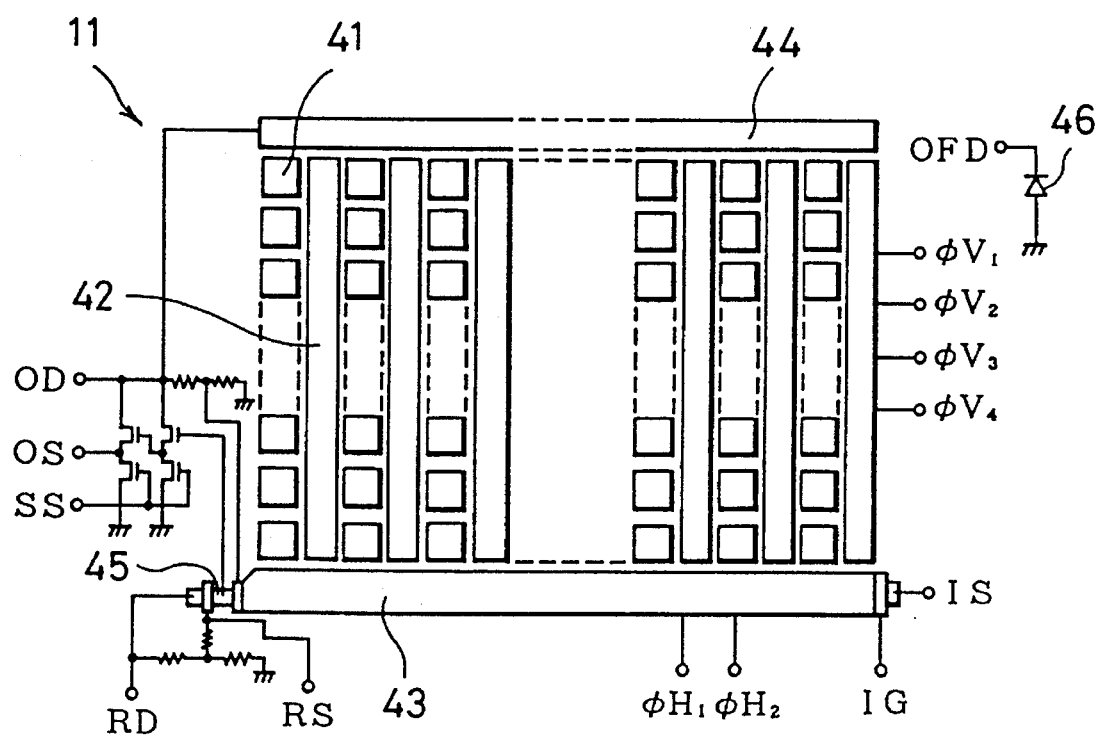
FIG. 2 is a block diagram showing a construction of a CCD.

FIG. 2 shows a construction of the CCD 11. As shown in this drawing, a photodiode 41 corresponding to each pixel is provided and outputs an electric charge corresponding the amount of light entering thereto. A vertical transfer CCD 42 is provided adjacent to the linear array of the photodiodes 41, and transfers an electric charge generated at the photodiodes 41 to a horizontal transfer CCD 43 or a discharge drain 44. A floating diffusion amplifier (FDA) 45 is connected to the horizontal transfer CCD 43, and changes an electric charge transferred from the horizontal transfer CCD 43 to a voltage, and outputs this voltage. An overflow drain (OFD) 46 is provided for discharging an overflow of electric charges caused by an excessive irradiation of light.

The operation of the first embodiment is described below with reference to the timing chart shown in FIG. 3.

When the release switch 26 is pressed in half way as shown by the reference mark R1, the control circuit 21 drives the photometry device 22 through the photometry drive circuit 23, whereby the photometry device 22 measures and calculates the state of exposure of an object as shown by the reference PH. Then, the control circuit 21 calculates the exposure of the object in accordance with an output of the photometry device 22.

When the release switch 26 is then fully pressed in as shown by the reference R2, the control circuit 21 controls the aperture drive circuit 24 in accordance with the result of the calculation of the exposure, whereby the aperture 13 is opened as shown by the reference AP. Accordingly, the quantity of light passing through the taking lens 12 is adjusted to a proper value by the aperture 13, and allowed to enter the CCD 11.

The control circuit 21 controls the CCD drive circuit 25, which supplies a vertical synchronizing signal VD, a horizontal drive signal, and 4-phase vertical drive signals, $\phi V1$ through $\phi V4$, which are synchronized with a horizontal synchronizing signal $\phi H$, $\phi H_2$, to the CCD 11. Hereinafter, the signals $\phi V1$ through $\phi V4$ are called "drive signals".

Figure 4:
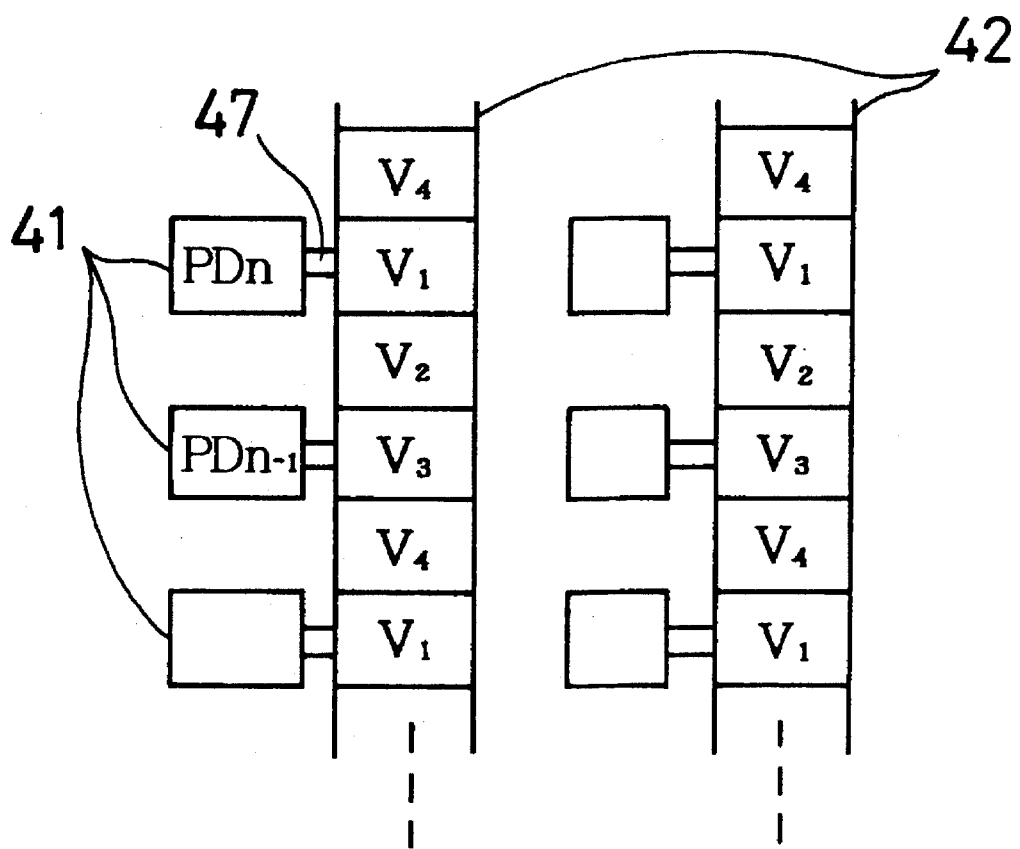
FIG. 4 is a block diagram showing a main part of the CCD.

As shown in FIG. 4, the vertical transfer CCD 42 is provided with four electrodes V1 through V4, which are repetitously arranged along the vertical transfer CCD 42, for a 4-phase drive. The photodiodes 41 are connected to the electrodes V1 and V3, respectively, through transfer gates (TG) 47. Electric charges accumulated at the photodiodes 41 are transferred to, and then along, the vertical transfer CCD 42 by controlling the electric voltage and phase of the drive signals applied to the electrodes V1 through V4.

TG pulses are then applied to the electrodes V1 and V3 at a predetermined timing, in the form of the drive signals V1 and $\phi$ $\phi V3$. As a result, electric charges which have accumulated on the photodiodes 41 are then transferred to the vertical transfer CCD 42. Then, the electric charges transferred to the vertical transfer CCD 42 are transferred therealong in accordance with high speed pulses applied to the electrodes V1 through V4 in the form of the drive signals $\phi V1$ through $\phi V4$, simultaneously with the output of the vertical synchronizing signal VD, and are then discharged to the discharge drain 44.

When a time TV has passed after a first TG pulse was generated, a second TG pulse is generated. At this time TV is obtained in accordance with a result of the photometry process. Namely, electric which are generated in the photodiodes 41 during the time TV are transferred to the vertical transfer CCD 42 in synchronization with the second TG pulse. Then, the aperture 13 is closed. The vertical transfer of the electric charge along the vertical transfer CCD 42 to the horizontal transfer CCD 43 is not started until a recording gate signal is outputted by the control circuit 21.

The control circuit 21 controls the CCD drive circuit 25 so that a charge pumping operation is carried out on electric charges which have been transferred to the vertical transfer CCD 42, until the aperture 13 is closed.

This charge pumping operation is described below with reference to FIGS. 5A and 5B.

Figure 5A:
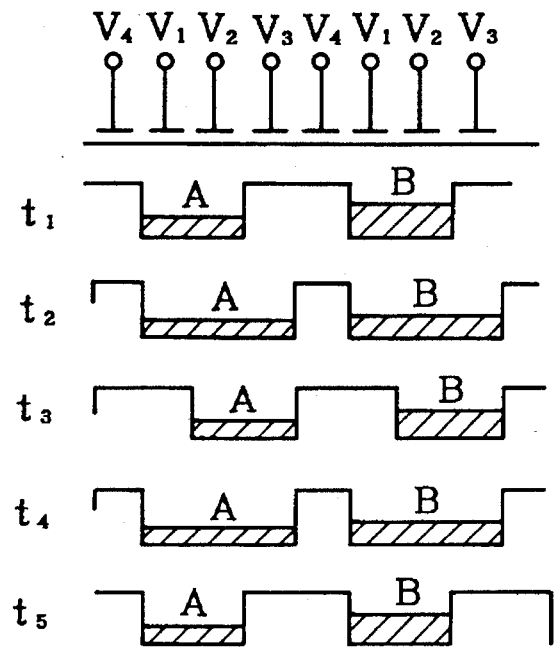
FIG. 5A is the timing chart showing a change in electric charge at each electrode.
Figure 5B:
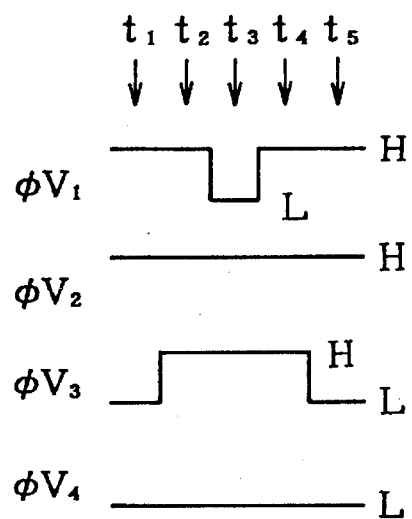
FIG. 5B is a timing chart showing the change in the level of each drive signal.

The CCD drive circuit 25 varies the levels of the drive signals $\phi V1$ through $\phi V4$ at each of times t1–t5, as shown in FIG. 5B. Namely, the level of the drive signal $\phi V1$ is low at time t3, and high at times t1, t2, t4, and t5; the level of the drive signal $\phi V2$ is always high; the level of the drive signal $\phi V3$ is low at times t1 and t5 and high at times t2 through t4, and a level of the drive signal $\phi V4$ is always low.

As a result, as shown in FIG. 5A, electric charges A and B, which are held at the first and second electrodes V1 and V2 at the first time t1, are diffused to the first, second and third electrodes V1, V2, and V3 at the second time t2. Thereafter, the electric charges are disposed only at the second and third electrodes V2 and V3 at the third time t3, and again diffused to the first, second and third electrodes V1, V2 and V3 at the fourth time t4. At the fifth time t5, the electric charges are returned to the first and second electrodes V1 and V2, in the same way as at the first time t1.

Then, in the same way as described above, the electric charges are again transferred to the second and third electrodes V2 and V3 and returned to the first and second electrodes V1 and V2, within a relatively short distance. Note, with regard to this action at one electrode of the vertical transfer CCD 42, since a charge pumping effect occurs in the electrodes V1 through V3 in FIG. 5A, this action is called a charge pumping operation.

Figure 6:
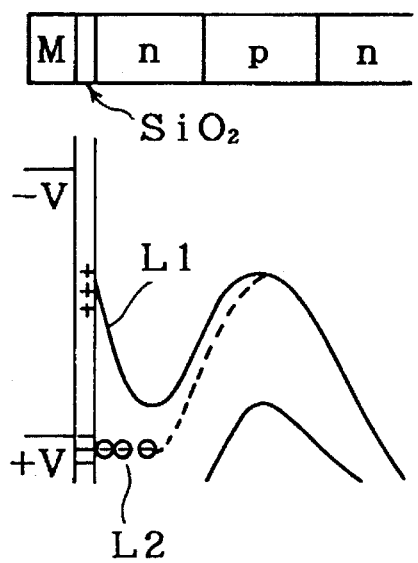
FIG. 6 is a diagram showing the voltage in a CCD element.

Accordingly, when the charge pumping operation is repeated, due to the occurrence of an interface trapping phenomenon, a positive hole is trapped near an oxide film of $SiO_2$ of the CCD, as shown by a solid line L1 in FIG. 6, But on the other hand, the largest amount of dark current is typically generated near the oxide film as shown by the reference L2. Accordingly, the dark current is bounded by the positive hole, and thus made to disappear.

The above charge pumping operation is repeated until the aperture 13 is closed.

Figure 3:
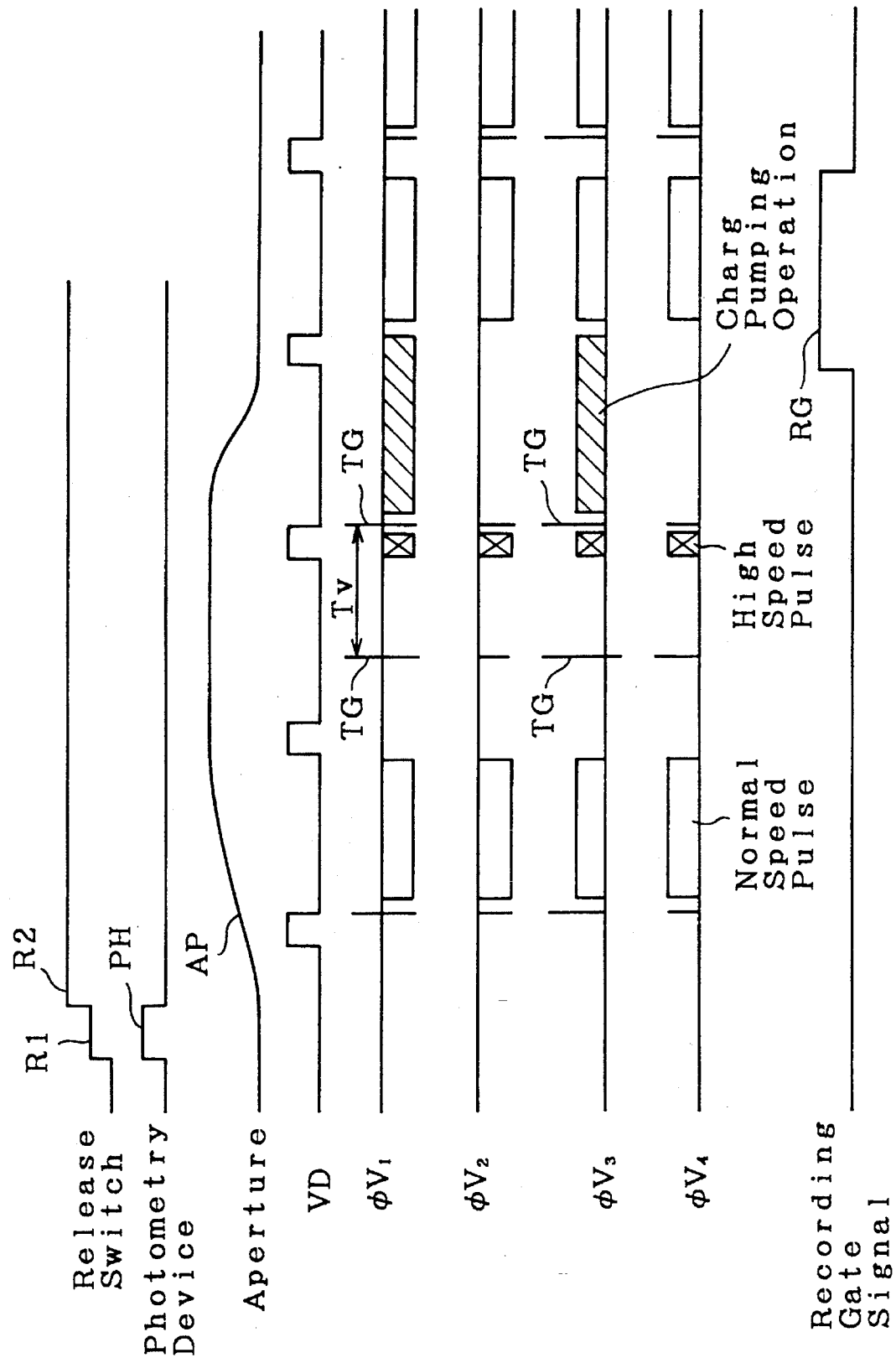
FIG. 3 is a timing chart showing an operation of the first embodiment.

After the aperture 13 is closed, the control circuit 21 outputs a recording gate signal, as shown by the reference RG in FIG. 3. As a result, the CCD drive circuit 25 is operated, whereby the electric charges held by the vertical transfer CCD 42 of the CCD 11 are transferred to the horizontal transfer CCD 43 and then inputted to the FDA 45 and converted to a voltage to be read by the image signal processing circuit 14. The image signal processed by the image signal processing circuit 14 is supplied to the magnetic disk drive device 15, to be recorded onto a video floppy disk.

As described above, according to the first embodiment, since the imaging device 11 is subjected to the charge pumping operation until the aperture is closed after a photographing operation, the effects of dark current on a photographed image are eliminated or greatly reduced.

Figure 7:
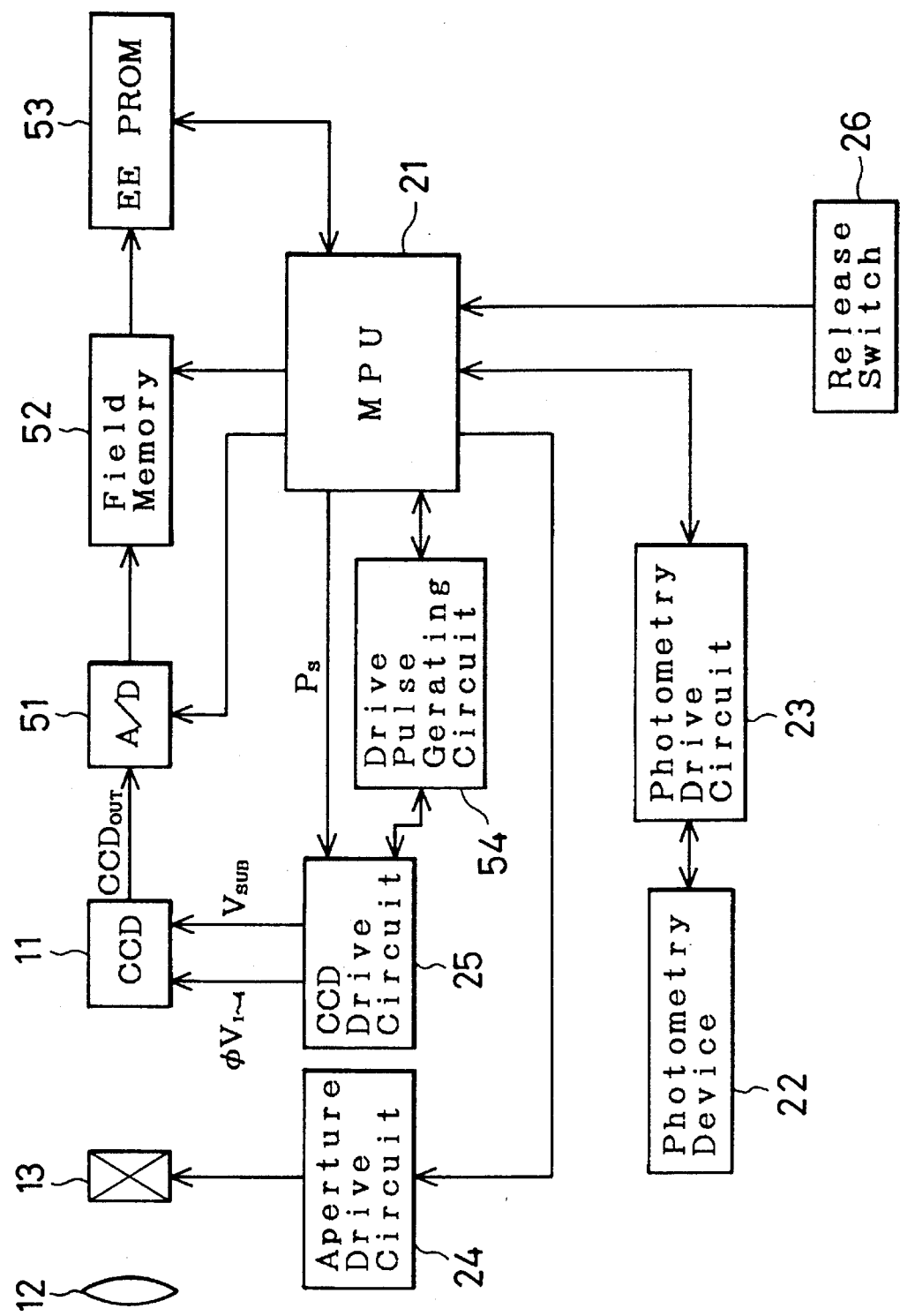
FIG. 7 is a block diagram showing a construction of a second embodiment of a control device for an imaging device according to the present invention.

FIG. 7 is a block diagram showing a construction of a second embodiment of a control device for an imaging device according to the present invention. The parts corresponding to those of the first embodiment are shown by the same reference numerals as shown in FIG. 1, and thus only the components not shown in the first embodiment are described below.

The CCD 11 outputs an image signal corresponding to an object image, to converter 51, which A-D converts the image signal to a digital signal. The digital image signal is once stored in a field memory 52, and is written in an EEPROM (Electrically Erasable Programable ROM) 53. Alternatively, the digital image signal may be D-A converted by a D-A converter (not shown) and then frequency-demodulated to be recorded in a video floppy disk (not shown). A drive pulse generating circuit 54 is provided between the control circuit 21 and the CCD drive circuit 25, to output a drive signal to the CCD drive circuit 25.

It is noted that, although the A-D converter 51, the field memory 52, the EEPROM 53, and the drive pulse generating circuit 54 are provided in the first embodiment, they were omitted from FIG. 1, in order to simplify the description of the embodiment. Further note, the CCD 11 of the second embodiment has the same construction as that of the first embodiment shown in FIGS. 2 and 4.

The operation of the second embodiment is described below with reference to the timing chart shown in FIG. 8.

When the release switch 26 is pressed in half way (reference R1), the photometry device 22 measures the state of exposure of an object to be photographed (reference PH), and the exposure of the object is then calculated in accordance with an output of the photometry device 22. When the release switch 26 is then fully pressed in (reference R2), the aperture 13 is opened (reference AP) whereby the quantity of light passing through the taking lens 12 is adjusted to a proper value and allowed to enter the CCD 11.

The control circuit 21 controls the CCD drive circuit 25, which supplies a vertical synchronizing signal VD, a horizontal drive signal, and 4-phase vertical drive signals, $\phi V1$ through $\phi V4$, which are synchronized with a horizontal synchronizing signal, to the CCD 11. Hereinafter, the signals $\phi V1$ through $\phi V4$ are simply called "drive signals", as in the first embodiment.

The control circuit 21 controls the CCD drive circuit 25 through operation of the drive pulse generating circuit 54. Accordingly, high speed pulses are applied to the electrodes V1 through V4 in the form of the drive signals $\phi V1$ through $\phi V4$, whereby electric charges held on the vertical transfer CCD 42 are discharged to the discharge drain 44 (FIG. 2). Further, the control circuit 21 outputs a signal PS (reference P1) to the CCD drive circuit 25, whereby a signal VSUB is changed to a high level (reference P2). As a result, all of the electric charges generated at the photodiodes of the CCD 11 are caused to flow to a substrate (not shown) of the CCD 11. Therefore, no electric charges remain at the photodiodes 41 (FIG. 4).

Furthermore, during a predetermined period (2-field period in this embodiment), no pulse is applied to the CCD 11 in the form of the drive signals $\phi V1$ through $\phi V4$. As a result, only a dark current is generated at the vertical transfer CCD 42 (FIG. 4) (electrodes V1 and V2 in this embodiment), and held thereat.

When the 2-field period has elapsed, the drive signals, $\phi V1$ through $\phi V4$, are applied to the vertical transfer CCD 42, and accordingly, an electric charge, which is accumulated at the vertical transfer CCD 42 and corresponds to the dark current, is transferred to the A-D converter 51 (the reference P3), to be thereby A-D converted. The A-D converted data is written to the EEPROM 53 through the field memory 52.

Then, at a predetermined timing, the level of the signal VSUB is lowered. As a result, an electric charge can be accumulated at the photodiodes 41 of the CCD 11. Further, when a predetermined time TV corresponding to a result of the photometry process has passed after the level of the signal VSUB was lowered, TG pulses are applied to the electrodes V1 and V3 in the form of the drive signals $\phi V1$ and $\phi V3$. Accordingly, electric charges accumulated at the photodiodes 41 are transferred to the vertical transfer CCD 42.

Thereafter, the aperture 13 is closed. The transfer of the electric charge from the vertical transfer CCD 42 to the horizontal transfer CCD 43 is started when a time TF (usually 1 through 4 fields) at which the aperture 13 is completely closed from a predetermined position has elapsed. This time TF corresponds to an aperture value determined in accordance with a result of the photometry process, which is determined and controlled by the control circuit 21.

After the aperture 13 is closed, a recording gate signal is outputted (reference P4) by the control circuit 21, and accordingly, the electric charge signal held at the electrodes of the vertical transfer CCD 42 are transferred to the A-D converter 51 to be A-D converted, and then written to the field memory 52 in synchronization with the drive signals $\phi V1$ through $\phi V4$.

After the electric shutter is closed (sometimes after the TG pulse is generated), the electric charges held at the vertical transfer CCD 42 are not read out to the A-D converter 51 until the aperture 13 is closed as described above. Therefore, a component corresponding to the dark current generated during this time at the vertical transfer CCD 42 is included in the electric charge signal written to the field memory 52. Therefore, the control circuit 21 calculates a dark current component I generated for the time TF, based on the predetermined time TP for which the storing means (field memory 52) stores data of the dark current in accordance with a dark current component IR of the 2-field period stored in the EEPROM 53, in accordance with the equation $$I=IR \times TF/TP$$

The control circuit then reads data stored in the field memory 52. Thereafter, the control circuit 21 subtracts the dark current component from this data, to thereby obtain data from which the dark current component has been removed, writes this data to the field memory 21, and then transfers the data to the EEPROM 53.

As described above, according to the second embodiment, a dark current component is obtained during a period in which a recording is completed, and after a photographing operation is finished, and it is subtracted from data stored in the field memory 52, whereby an effect of the dark current is eliminated.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. HEI 2-136521 and HEI 2-136522 (both filed on May 25, 1990) which are expressly incorporated herein by reference in their entirety.

I claim:

1. A device for controlling an imaging device which outputs an image signal corresponding to an object, comprising:

a mechanically operated aperture that controls an exposure of said object; and means for removing a dark current that is generated during an operating time required for said aperture to move to a completely closed position from an open position upon initiation of a closing of an aperture command, said operating time comprising a variable time, said removing means comprising:

a detecting device that detects an amount of dark current that exists during a predetermined time period, where the predetermined time period is prior to an initiation of a closing of said aperture;

a storage device that stores said detected amount of dark current;

a control device that obtains an amount of dark current generated during said operating time, based upon said detected amount of dark current and said operating time; and a subtractor that subtracts said amount of dark current obtained by said control device, to thereby eliminate an effect of said dark current.

2. The device of claim 1, wherein said storage device stores digital data representing said detected dark current.

3. The device of claim 1, wherein said imaging device comprises a CCD.

4. The device of claim 1, further comprising a device that drives said aperture.

5. The device of claim 1, wherein said device is used with an electronic camera.

6. The device of claim 1, wherein said control device calculates said dark current component according to an equation:

$$I = IR \cdot TF/2$$

wherein

TF corresponds to a time when said aperture is completely closed from said open position;

2 refers to a 2-field period;

IR equals said dark current stored in said storage device; and

I equals said dark current generated for said 2-field period.

* * * * *

UNITED STATES PATENT AND TRADEMARK OFFICE
CERTIFICATE OF CORRECTION

PATENT NO. : 5,477,265
DATED : December 19, 1995
INVENTOR(S) : Nobuhiro Tani

It is certified that error appears in the above-indentified patent and that said Letters Patent is hereby corrected as shown below:

```
Title page, item[56], References Cited, Foreign Patent Documents, insert
-- 3919457    12/1989    Germany--
--0396045     11/1990    European Patent Office--.
```

Signed and Sealed this

Seventeenth Day of December, 1996

Attest:

BRUCE LEHMAN

*Attesting Officer*   Commissioner of Patents and Trademarks